United States Patent
Zhang et al.

(10) Patent No.: US 10,912,074 B2
(45) Date of Patent: Feb. 2, 2021

(54) DATA TRANSMISSION METHOD AND APPARATUS

(71) Applicant: Huawei Technologies Co., Ltd., Shenzhen (CN)

(72) Inventors: Xu Zhang, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/533,396

(22) Filed: Aug. 6, 2019

(65) Prior Publication Data

US 2019/0364568 A1   Nov. 28, 2019

Related U.S. Application Data

(63) Continuation of application No. PCT/CN2018/075289, filed on Feb. 5, 2018.

(30) Foreign Application Priority Data

Feb. 6, 2017   (CN) .......................... 2017 1 0065943

(51) Int. Cl.
*H04W 72/04*   (2009.01)
*H04L 1/18*   (2006.01)

(52) U.S. Cl.
CPC ........... *H04W 72/042* (2013.01); *H04L 1/189* (2013.01); *H04W 72/0466* (2013.01)

(58) Field of Classification Search
CPC .. H04W 72/042; H04W 72/0466; H04L 1/189
See application file for complete search history.

(56) References Cited

U.S. PATENT DOCUMENTS 9,119,197 B2   8/2015   Xia et al.
2011/0222491 A1   9/2011   Vajapeyam et al.
(Continued)

FOREIGN PATENT DOCUMENTS

CN   101610564 A   12/2009
CN   101877621 A   11/2010
(Continued)

OTHER PUBLICATIONS

"Details on the Design of Two Stage Downlink Control Channel for NR," 3GPP TSG RAN WG1 Meeting NR AdHoc, Spokane, USA, R1-1700319, XP051202798, pp. 1-8, 3rd Generation Partnership Project, Valbonne, France (Jan. 16-20, 2017).
(Continued)

*Primary Examiner* — Tejis Daya
(74) *Attorney, Agent, or Firm* — Leydig, Voit & Mayer, Ltd.

(57) ABSTRACT

Embodiments provide a data transmission method that includes: receiving, by a terminal device, first downlink control information (DCI) sent by a network device on a first downlink control channel; receiving, by the terminal device on a first downlink data channel indicated by the first DCI, a first transport block sent by the network device; receiving, by the terminal device, fourth DCI sent by the network device on a fourth downlink control channel, where the fourth DCI includes first encoding information, and the first encoding information is used to indicate a first encoding mode of the first transport block; and performing, by the terminal device, decoding based on the first encoding information, to obtain the first transport block. In this way, a data packet loss probability can be reduced.

20 Claims, 4 Drawing Sheets

(56) References Cited

U.S. PATENT DOCUMENTS

| | | | |
|---|---|---|---|
| 2012/0033627 A1 | 2/2012 | Li et al. | |
| 2012/0201216 A1 | 8/2012 | Wu | |
| 2014/0133440 A1 | 5/2014 | Zhang et al. | |
| 2016/0128028 A1* | 5/2016 | Mallik | H04L 1/1861 370/336 |
| 2016/0366672 A1 | 12/2016 | Papasakellariou et al. | |
| 2018/0092070 A1* | 3/2018 | Liao | H04L 5/0094 |
| 2018/0098307 A1* | 4/2018 | Yang | H04L 5/0053 |
| 2019/0312679 A1* | 10/2019 | Jayasinghe | H03M 13/095 |

FOREIGN PATENT DOCUMENTS

| | | |
|---|---|---|
| CN | 102056198 A | 5/2011 |
| CN | 102123524 A | 7/2011 |
| CN | 106162907 A | 11/2016 |
| WO | 2013013394 A1 | 1/2013 |
| WO | 2016119232 A1 | 8/2016 |

OTHER PUBLICATIONS

"Email discussion [86b-23] on multi-steps DL control channel design," 3GPP TSG RAN WG1 Meeting #87, Reno, USA R1-1611656, XP051190942, pp. 1-14, 3rd Generation Partnership Project, Valbonne, France (Nov. 14-18, 2016).

"2-Stage DCI," 3GPP TSG-RAN WG1 NR AdHoc, Spokane USA, R1-1700815, pp. 1-4, 3rd Generation Partnership Project, Valbonne, France (Jan. 16-20, 2017).

"On 2-stage Downlink Control Information for NR," 3GPP TSG RAN WG1 Meeting #87, Reno, USA, R1-1612121, pp. 1-5, 3rd Generation Partnership Project, Valbonne, France (Nov. 14-18, 2016).

\* cited by examiner

DATA TRANSMISSION METHOD AND APPARATUS

CROSS-REFERENCE TO RELATED APPLICATIONS

This application is a continuation of International Application No. PCT/CN2018/075289, filed on Feb. 5, 2018, which claims priority to Chinese Patent Application No. 201710065943.6, filed on Feb. 6, 2017. The disclosures of the aforementioned applications are hereby incorporated by reference in their entireties.

TECHNICAL FIELD

Embodiments of the present invention relate to the communications field, and more specifically, to a data transmission method and apparatus.

BACKGROUND

In a next-generation wireless communications system, control channels are two-level control channels. The two-level control channels include a level-1 control channel and a level-2 control channel. Correspondingly, in downlink transmission, downlink control information DCI also includes first DCI and second DCI. The level-1 control channel carries the first DCI, and the first DCI may include resource indication information or the like. The level-2 control channel carries the second DCI, and the second DCI may include indication information related to encoding information of a transport block or the like. The first DCI and the second DCI are used to jointly instruct a terminal device to receive a data signal corresponding to a same transport block.

After a base station sends the data signal to the terminal device, the terminal device needs to demodulate and decode the data signal based on the first DCI and the second DCI, to obtain the transport block. Therefore, a precondition for obtaining the transport block by the terminal device is that the terminal device can correctly receive the first DCI and the second DCI.

However, because there are two-level control channels in the system, and the second DCI can be received only after the first DCI is correctly received, a packet loss probability of DCI in the communications system that supports two-level control channels is greater than that in a communications system that supports single-level control channels. Consequently, a structure of the two-level control channels causes an increase in a data packet loss probability, thereby severely affecting data transmission reliability, and affecting data transmission efficiency.

Therefore, how to eliminate an increase in the data packet loss probability that is caused by the structure of the two-level control channels has become a problem that needs to be urgently resolved in the industry.

SUMMARY

Embodiments of the present invention provide a data transmission method and apparatus, so that a data packet loss probability can be reduced. In particular, for a data loss resulting from a loss of a level-2 control channel that is caused by a structure of two-level control channels, the data packet loss probability can be more effectively reduced in the embodiments of the present invention.

According to a first aspect, a data transmission method is provided. The method includes:

receiving, by a terminal device, first downlink control information DCI sent by a network device on a first downlink control channel, where a time segment corresponding to the first downlink control channel belongs to a first time segment;

receiving, by the terminal device on a first downlink data channel indicated by the first DCI, a first transport block sent by the network device, where a time segment corresponding to the first downlink data channel belongs to the first time segment;

receiving, by the terminal device, fourth DCI sent by the network device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block; and performing, by the terminal device, decoding based on the first encoding information, to obtain the first transport block.

Therefore, according to the data transmission method in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

With reference to the first aspect, in a first implementation of the first aspect, the performing, by the terminal device, decoding based on the first encoding information, to obtain the first transport block includes:

when the terminal device fails to receive, based on the first DCI, second DCI sent by the network device on a second downlink control channel, performing, by the terminal device, decoding based on the first encoding information, to obtain the first transport block, where a time segment corresponding to the second downlink control channel belongs to the first time segment, and the second DCI includes the first encoding information.

With reference to the first aspect, in a second implementation of the first aspect, the method further includes:

receiving, by the terminal device, third DCI sent by the network device on a third downlink control channel, where a time segment corresponding to the third downlink control channel belongs to the second time segment; and receiving, by the terminal device on a second downlink data channel indicated by the third DCI, a second transport block sent by the network device, where a time segment corresponding to the second downlink data channel belongs to the second time segment, where the fourth DCI further includes second encoding information, the second encoding information is used to indicate a second encoding mode of the second transport block, and the second transport block is retransmission of the first transport block; and the performing, by the terminal device, decoding based on the first encoding information, to obtain the first transport block includes:

performing, by the terminal device, combined decoding based on the first encoding information and the second encoding information, to obtain the first transport block.

In this way, the terminal device can perform combined decoding based on the first encoding information and the second encoding information, so that decoding accuracy can be more effectively improved, and the first transport block (or the second transport block) is correctly obtained.

With reference to the first aspect, in a third implementation of the first aspect, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block; and the performing, by the terminal device, combined decoding based on the first encoding information and the second encoding information, to obtain the first transport block includes:

determining, by the terminal device based on the first data indication information and the second data indication information, that the second transport block is retransmission of the first transport block; and performing, by the terminal device, combined decoding based on the first redundancy version information and the second redundancy version information, to obtain the first transport block.

With reference to the first aspect, in a fourth implementation of the first aspect, the first DCI further includes first modulation information of the first transport block, and the first modulation information is used to indicate a modulation mode of the first transport block; and the receiving, by the terminal device on a first downlink data channel indicated by the first DCI, a first transport block sent by the network device includes:

receiving, by the terminal device on the first downlink data channel, a first data signal sent by the network device, where the first data signal is generated after the network device encodes and modulates the first transport block; and demodulating, by the terminal device, the first data signal based on the first modulation information.

With reference to the first aspect, in a fifth implementation of the first aspect, the method further includes: buffering, by the terminal device, a data signal obtained after the first data signal is demodulated.

With reference to the first aspect, in a sixth implementation of the first aspect, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

According to a second aspect, a data transmission method is provided. The method includes:

sending, by a network device, first downlink control information DCI to a terminal device on a first downlink control channel, where a time segment corresponding to the first downlink control channel belongs to a first time segment;

sending, by the network device, a first transport block to the terminal device on a first downlink data channel indicated by the first DCI, where a time segment corresponding to the first downlink data channel belongs to the first time segment; and sending, by the network device, fourth DCI to the terminal device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

Therefore, according to the data transmission method in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

With reference to the second aspect, in a first implementation of the second aspect, the method further includes:

sending, by the network device, second DCI to the terminal device on a second downlink control channel indicated by the first DCI, where a time segment corresponding to the second downlink control channel belongs to the first time segment, and the second DCI includes the first encoding information.

With reference to the second aspect, in a second implementation of the second aspect, the method further includes:

sending, by the network device, third DCI to the terminal device on a third downlink control channel, where a time segment corresponding to the third downlink control channel belongs to the second time segment; and sending, by the network device, a second transport block to the terminal device on a second downlink data channel indicated by the third DCI, where a time segment corresponding to the second downlink data channel belongs to the second time segment, where the fourth DCI further includes second encoding information, the second encoding information is used to indicate a second encoding mode of the second transport block, and the second transport block is retransmission of the first transport block.

In this way, the terminal device can perform combined decoding based on the first encoding information and the second encoding information, so that decoding accuracy can be more effectively improved, and the first transport block (or the second transport block) is correctly obtained.

With reference to the second aspect, in a third implementation of the second aspect, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block.

With reference to the second aspect, in a fourth implementation of the second aspect, the first DCI further includes first modulation information of the first transport block, and the first modulation information is used to indicate a modulation mode of the first transport block.

With reference to the second aspect, in a fifth implementation of the second aspect, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

According to a third aspect, a data transmission apparatus is provided. The apparatus may be configured to perform operations of the terminal device according to the first aspect and any possible implementation of the first aspect. Specifically, the apparatus may include modular units that are configured to perform the operations of the terminal device according to the first aspect or any possible implementation of the first aspect.

According to a fourth aspect, a data transmission apparatus is provided. The apparatus may be configured to perform operations of the network device according to the second aspect and any possible implementation of the second aspect. Specifically, the apparatus may include modular units that are configured to perform the operations of the network device according to the second aspect and any possible implementation of the second aspect.

According to a fifth aspect, a terminal device for data transmission is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the execution enables the terminal device to perform the method according to the first aspect or any possible implementation of the first aspect, or the execution enables the terminal device to implement the apparatus according to the third aspect.

According to a sixth aspect, a network device for data transmission is provided. The network device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the execution enables the network device to perform the method according to the second aspect or any possible implementation of the second aspect, or the execution enables the network device to implement the apparatus according to the fourth aspect.

According to a seventh aspect, a computer readable storage medium is provided and is configured to store a computer program. The computer program includes an instruction that is used to perform the method according to the first aspect and any possible implementation of the first aspect.

According to an eighth aspect, a computer readable storage medium is provided and is configured to store a computer program. The computer program includes an instruction that is used to perform the method according to the second aspect and any possible implementation of the second aspect.

DESCRIPTION OF EMBODIMENTS

Figure 1:
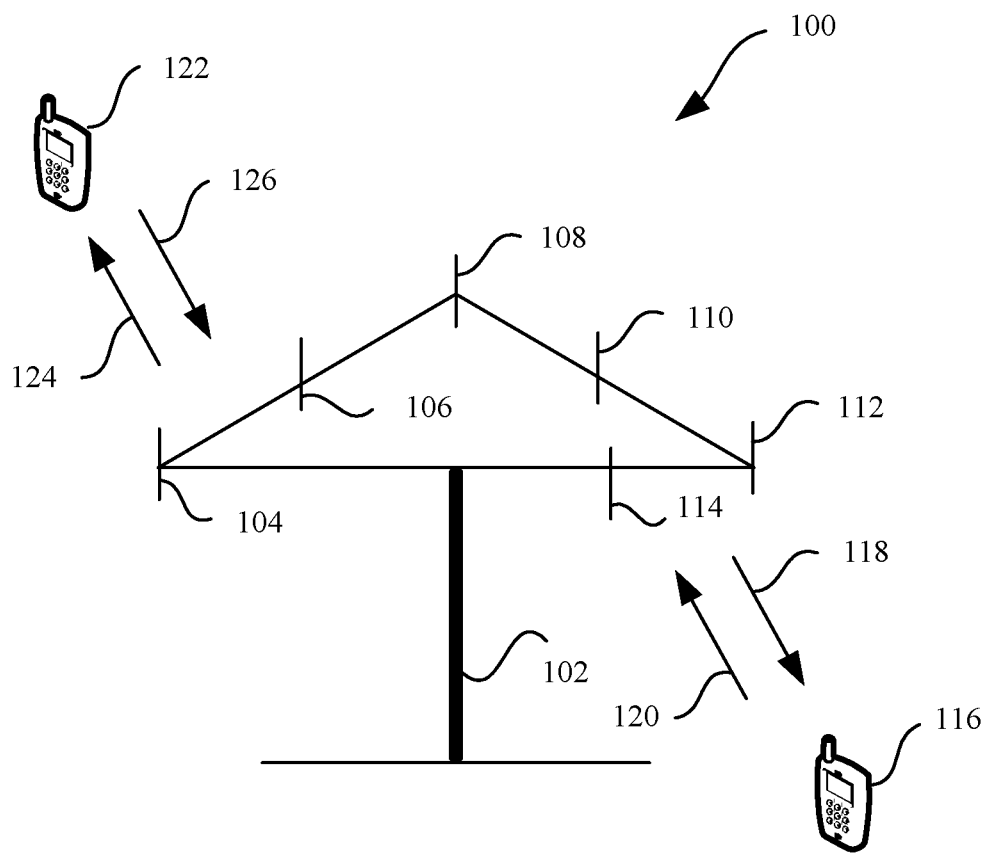
FIG. 1 is a schematic diagram of a data transmission communications system to which an embodiment of the present invention is applied.

The following clearly and completely describes the technical solutions in embodiments of the present invention with reference to the accompanying drawings in the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and the components may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that the embodiments of the present invention may be applied to various communications systems, for example, a global system for mobile communications (GSM), a wideband code division multiple access (WCDMA) system, and an LTE system. Supported communication is mainly voice and data communication. One conventional base station usually supports a limited quantity of connections and the connections are easy to implement.

A next-generation mobile communications system enables growth of future mobile data traffic, massive internet of things, and diversified new services and application scenarios. In addition to serving as a universal connection framework, basic 5G new radio (5th Generation New Radio, 5G NR) of a new-generation cellular network is expected to improve a data speed, a capacity, a latency, reliability, efficiency, and coverage to a brand new level, and fully use every bit of available spectrum resource. In addition, designed based on orthogonal frequency division multiplexing (OFDM) new radio, 5G will become a global standard, support 5G devices and diversified deployment, include diversified spectrums (including coverage on a low frequency band and a high frequency band), and support diversified services and terminals.

The embodiments are described in the embodiments of the present invention with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved PLMN network, or the like.

In addition, the embodiments are described in the embodiments of the present invention with reference to a network device. The network device may be a device configured to communicate with a mobile device. The network device may be an access point (AP) in a WLAN or a base transceiver station (BTS) in GSM or code division multiple access (CDMA); or may be a NodeB (NB) in WCDMA; or may be an evolved NodeB (eNB or eNodeB) in LTE, a relay station or an access point, a vehicular device, a wearable device, a network device in a future 5G network, a network device in a future evolved PLMN network, or the like.

Methods and apparatuses provided in the embodiments of the present invention may be applied to a terminal device or a network device. The terminal device or the network device includes a hardware layer, an operating system layer that runs above the hardware layer, and an application layer that runs above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, text processing software, and instant messaging software. In addition, in the embodiments of the present invention, a specific structure of an execution body of the control information transmission method is not specially limited in the embodiments of the present invention, provided that communication can be performed according to the control information transmission method in the embodiments of the present invention by running a program that records code of the control information transmission method in the embodiments of the present invention. For example, the wireless communication method in the embodiments of the present invention may be performed by a terminal device or a network device, or by a function module that is in the terminal device or the network device and that can invoke a program and execute the program.

In addition, aspects or features in the embodiments of the present invention may be implemented as a method, or an apparatus or a product that uses standard programming and/or engineering technologies. The term "product" used in the embodiments of the present invention covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel, and various other media that can store, contain, and/or carry an instruction and/or data.

FIG. 1 is a schematic diagram of a data transmission communications system to which an embodiment of the present invention is applied. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 may be, for example, a cellular phone, a smartphone, a portable computer, a hand-held communications device, a hand-held computing device, a satellite radio apparatus, a global positioning system, a PDA, and/or any other applicable device that is used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or antenna array including a plurality of antennas) and/or area that are/is designed for communication are/is referred to as a sector of the network device 102. For example, an antenna array may be designed to communicate with a terminal device in a sector within coverage of the network device 102. In a process in which the network device 102 communicates with the terminal devices 116 and 122 by using the forward links 118 and 124 respectively, a transmit antenna of the network device 102 may improve signal-to-noise ratios of the forward links 118 and 124 through beamforming. In addition, in comparison with a manner of sending, by the network device, signals to all terminal devices of the network device by using a single antenna, when the network device 102 sends signals to the randomly scattered terminal devices 116 and 122 in a related coverage area through beamforming, a mobile device in a neighboring cell suffers relatively weak interference.

At a given time, the network device 102, the terminal device 116, or the terminal device 122 may be a wireless communication sending apparatus and/or a wireless communication receiving apparatus. When sending data, the wireless communication sending apparatus may encode data for transmission.

Specifically, the wireless communication sending apparatus may obtain (for example, generate, receive from another communications apparatus, or store in a memory) a specific quantity of data bits that are to be sent to the wireless communication receiving apparatus by using a channel. This type of data bits may be included in a transport block (or a plurality of transport blocks) of data and the transport block may be segmented to generate a plurality of code blocks.

In addition, the communications system 100 may be a public land mobile network (PLMN) network, a D2D network, an M2M network, or another network. FIG. 1 is a simplified schematic diagram shown as an example. A network may further include other network devices that are not shown in FIG. 1.

In a next-generation wireless communications system, control channels may be two-level control channels: a level-1 control channel and a level-2 control channel.

The following describes in detail, by using downlink transmission as an example, two-level control channels to which the embodiments of the present invention are applied.

Figure 2:
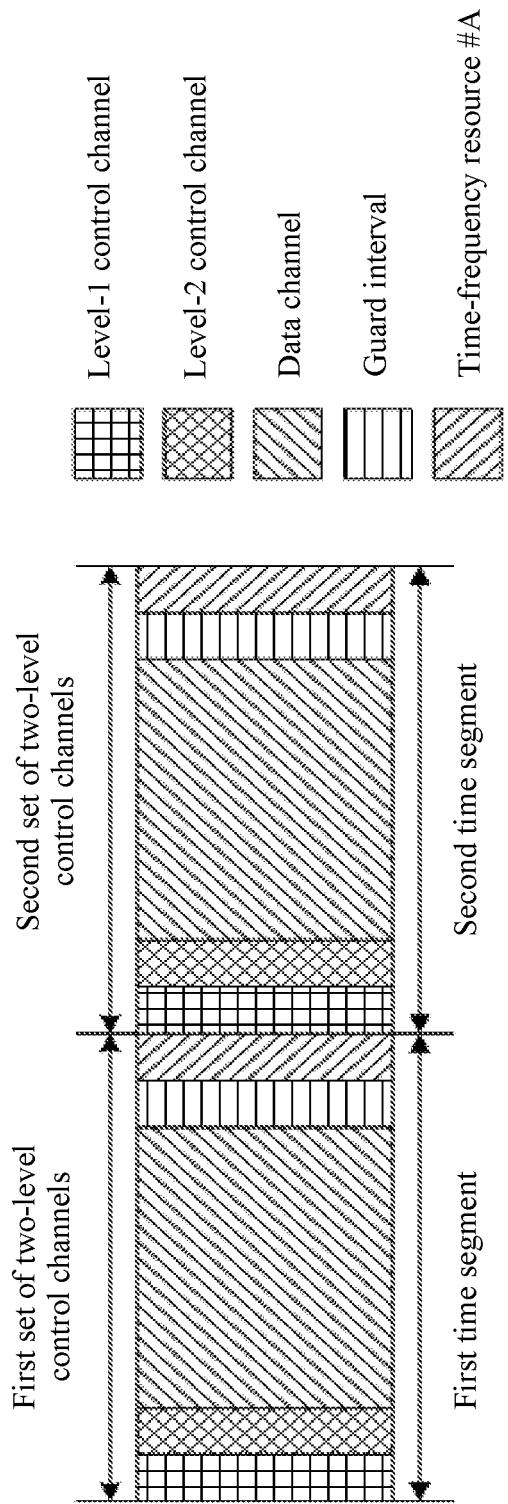
FIG. 2 is a schematic structural diagram of two-level control channels to which an embodiment of the present invention is applied.

First, a communications system including two-level control channels is described in detail from a perspective of a structure of the two-level control channels by using a structure of two-level control channels shown in FIG. 2 as an example.

It should be noted that a transport block in this embodiment of the present invention indicates original data information and includes a physical-layer transport block. In addition, the transport block may further include information obtained after an access network device performs cyclic redundancy check (CRC) on data information, or the like. A data signal represents a data signal generated after a corresponding transport block is encoded and modulated; or in some aspects, a data signal may represent a data signal generated after channel encoding is performed on a corresponding transport block; or in some aspects, a data signal may represent a data signal generated after channel encoding and scrambling are performed on a corresponding transport block.

In a slot shown in FIG. 2, a level-1 control channel carries one part of downlink control information (DCI) (denoted by DCI #A for ease of distinguishing and understanding), a level-2 control channel carries the other part of DCI (denoted by DCI #B for ease of distinguishing and understanding) other than the part of downlink control information, and a data channel carries a transport block, to be specific, the data channel carries a data signal corresponding to the transport block. Indication information included in the DCI #A and indication information included in the DCI #B are both used for the transport block, in other words, are both used to instruct a terminal device to receive the transport block. A base station sends the transport block through the data channel, and the terminal device performs demodulation and decoding based on the DCI #A and the DCI #B, to obtain the transport block. More specifically, the terminal device demodulates and decodes, based on the DCI #A and the DCI #B, the data signal corresponding to the transport block, to obtain the transport block. In a last time segment of the slot shown in FIG. 2, the terminal device sends feedback acknowledgement information for a result of the current demodulation and decoding: If the terminal device succeeds in performing demodulation and decoding, the terminal device sends acknowledgement (ACK) information; and if the demodulation and the decoding that are performed by the terminal device fails, the terminal device sends negative acknowledgement (NACK) information. After receiving the feedback acknowledgement information, the base station needs to demodulate and decode the feedback acknowledgement information to determine whether the terminal device correctly obtains the transport block, and determine, based on the result of the demodulation and decoding, whether to send a new transport block or the original transport block (in other words, retransmission of the previous transport block) in a next slot.

To ensure a low-latency indicator of data transmission, a time interval between a sending time of a transport block in a next slot and a sending time of feedback acknowledgement information in a current slot is as short as possible.

The structure of the two-level control channels shown in FIG. 2 is still used as an example. The time segment between the sending time of the transport block in the next slot and the sending of the feedback acknowledgement information in the current slot is merely a time segment occupied by the two-level control channels. This transmission mode can reduce a latency of data transmission, but if a base station fails to demodulate and decode the feedback acknowledgement information in the current slot, the base station cannot determine whether data information sent in the next slot is new data information or original data information. In this case, before the base station sends a level-1 control channel in the next slot, encoding information used to indicate an encoding mode of the data information sent in the next slot cannot be determined. Consequently, the encoding information cannot be included in DCI carried by the level-1 control channel, but can be included only in DCI carried by a level-2 control channel.

Content of the DCI #A carried by the level-1 control channel and content of the DCI #B carried by the level-2 control channel are separately described in detail below when the DCI carried by the level-2 control channel includes the encoding information.

The DCI #A may include the following information:

(1) First Resource Indication Information

The first resource indication information is used to instruct the terminal device to receive a time-frequency resource of a transport block.

Specifically, a size and a location of the time-frequency resource are included. A minimum scheduling granularity of a frequency domain resource is 12 consecutive subcarriers, and a minimum scheduling granularity of a time domain resource is N consecutive orthogonal frequency division multiplexing (OFDM) symbols. A value of N may be 1, 2, 7, or 14. A specific value of N is not limited in this embodiment of the present invention.

The network device may determine, based on quality information of a channel between the terminal device and the network device, a time-frequency resource required to send data.

(2) Data Identification Information

The data identification information is used to identify a transport block of current transmission.

Specifically, the data identification information may be a hybrid automatic repeat (HARQ) process number or other identification information that can uniquely identify data.

(3) Device Identity Information

The device identity information may be ID information that can uniquely identify the terminal device.

Specifically, the ID information of the terminal device may be used as scrambling code to be scrambled to cyclic redundancy code (CRC) of first DCI or be explicitly indicated in a field of first DCI.

For example, if a bit sequence of the first DCI is $\{n_0, n_1, \ldots, n_{K-1}\}$, a CRC sequence generated based on the bit sequence of the first DCI is $\{s_0, s_1, \ldots, s_{V-1}\}$. If an ID of the terminal device is a bit sequence $\{e_0, e_1, \ldots, e_{V-1}\}$ whose length is R, scrambling of the CRC by using the ID information of the terminal device may be provided in the following formula:

$$f_i = (e_i + s_i) \bmod 2, i \in \{0, 1, 2, \ldots, V-1\}$$

In this case, a CRC sequence obtained after the scrambling is represented by $\{f_0, f_1, \ldots, f_{V-1}\}$.

(4) Modulation Information

The modulation information is used to indicate, to the terminal device, a modulation mode used by the network device to modulate the transport block.

Specifically, the modulation mode may include QPSK, 16QAM, 64QAM, or the like.

(5) Information Related to the Level-2 Control Channel

The information related to the level-2 control channel may include: encoding information of second DCI carried by the level-2 control channel, to be specific, an encoding mode used by the network device to encode the second DCI; a bit size of information included in the second DCI; and a quantity of time-frequency resources of a unit control channel occupied by the level-2 control channel, for example, a value of an aggregation level of the second control channel.

The DCI #B may include the following information:

(1) Encoding Information

The encoding information is used to indicate an encoding mode used by the network device to perform channel encoding on the current transport block. Specifically, the encoding mode may be a value of an encoding rate, and the encoding rate is used to indicate a relationship between a quantity of wanted bits and a total quantity of bits.

The encoding information may include data indication information and redundancy version (RV) information. The data indication information is used to indicate whether the transport block currently sent by the network device is a new transport block. The RV information is used to indicate an RV number corresponding to the currently sent transport block. The encoding rate of the transport block may be indirectly determined by using the data indication information and the RV version number in the RV information. To be specific, a ratio of a quantity of bits of the transport block indicated by the data indication information to a quantity of bits of the RV number is the encoding rate of the transport block.

(2) Location Identification Information

The location identification information is used to indicate a start location that is in a circular buffer and that is of a data signal corresponding to the currently received transport block. The data signal corresponding to the currently received transport block is a data signal obtained after the network device performs channel encoding on the transport block. In other words, the circular buffer is configured to buffer the data signal obtained after channel encoding is performed on the transport block.

Different start locations in the circular buffer correspond to different RV numbers, and the different RV numbers correspond to initial transmission or retransmission of a same transport block. For example, initial transmission is defined as an RV 0, a first time of retransmission is defined as an RV 2, a second time of retransmission is defined as an RV 3, and a third time of retransmission is defined as an RV 1. In other words, a sequence of redundancy versions is {0, 2, 3, 1}.

(3) Second Resource Indication Information

The second resource indication information is used to indicate a specific value of a resource used by the terminal device to send the feedback acknowledgement information. The resource may be at least one of a time domain resource, a frequency domain resource, or a code domain resource. A set of resources used by the terminal device to send the feedback acknowledgement information may be configured for user equipment by using higher layer signaling, for example, radio resource control (RRC) signaling.

Specifically, for example, the higher layer signaling indicates that the set of resources is {1, 2, 4}, and the set of resources indicates that an interval between a time domain location at which the terminal device receives the transport block and a time domain location at which the terminal device sends the feedback acknowledgement information after receiving the transport block is 1, 2, or 4 slots; and if a time domain location indicated by the second resource indication information is 2, a time domain location at which the terminal device sends the feedback acknowledgement information is a second slot after the transport block is received; or if a time domain location at which the transport block is received is denoted by an $n^{th}$ slot, a time domain location at which the terminal device sends the feedback acknowledgement information is an $(n+2)^{th}$ slot.

Similarly, indication manners of the frequency domain resource and the code domain resource are similar to an indication manner of the time domain resource.

It should be understood that the foregoing related information included in the DCI #A and the DCI #B are merely described as examples. This embodiment of the present invention is not limited to this.

For example, all information in the DCI #A except the information related to the level-2 control channel may be configured in the DCI #B. Similarly, the second resource indication information in the DCI #B may also be configured in the DCI #A.

In addition, the DCI #A and the DCI #B may further include information except the foregoing listed information. This embodiment of the present invention is not limited to this.

In the descriptions, when the DCI carried in the level-2 control channel includes the encoding information and the terminal device fails to receive the level-2 control channel, the terminal device cannot decode the data information by using the encoding information, and consequently, data is lost.

Therefore, in comparison with a system including only a single-level control channel, in the system including the two-level control channels according to this embodiment of the present invention, it is assumed that packet loss probabilities of both levels of control channels are the same, to ensure that a probability that each level of control channel is successfully received is lower than the probability in the system including only the single-level control channel.

Therefore, because a structure of the two-level control channels causes an increase in the packet loss probability of the control channels and causes an increase in a packet loss probability of the data information, data transmission reliability is severely affected, and data transmission efficiency is affected.

To eliminate the increase in the packet loss probability of the data information that is caused by the structure of the two-level control channels, an embodiment of the present invention provides a data transmission method, so that the packet loss probability of the data information can be effectively reduced.

Figure 3:
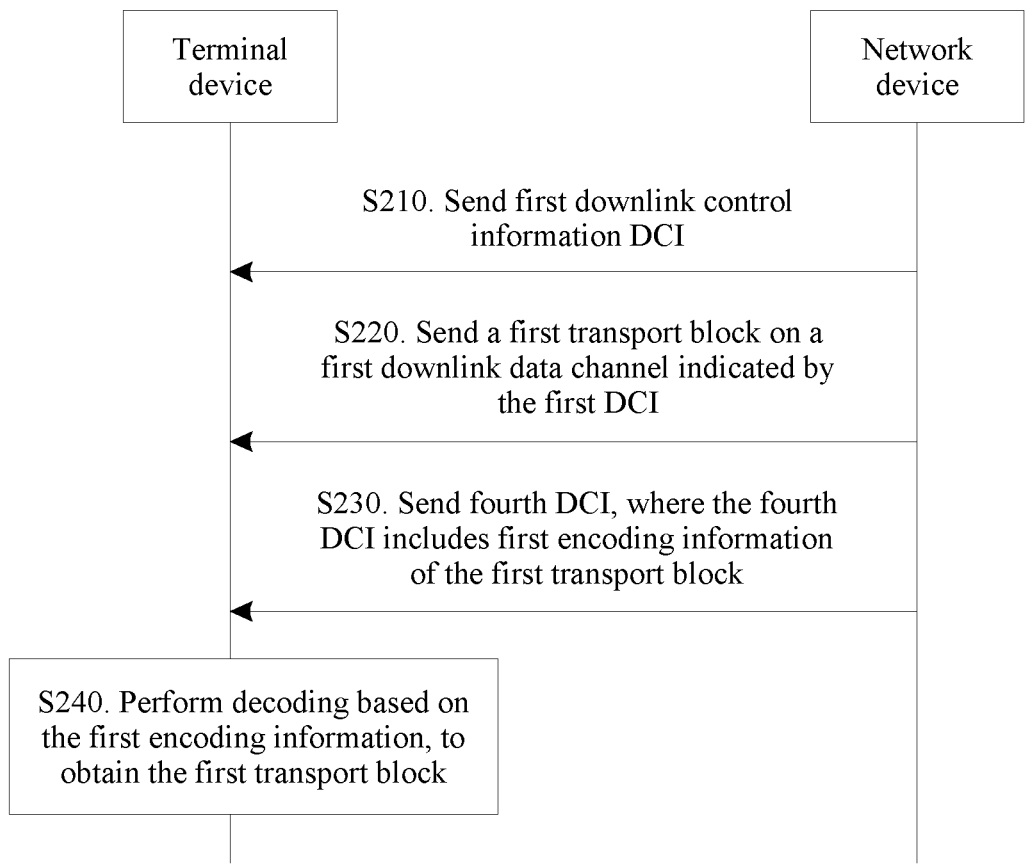
FIG. 3 is a schematic flowchart of a data transmission method according to an embodiment of the present invention.

FIG. 3 is a schematic interaction diagram of a data transmission method according to an embodiment of the present invention from a perspective of device interaction.

In this embodiment of the present invention, a time segment may be understood as a time domain resource, and a time domain unit used to indicate the time domain resource may be a symbol, a mini-slot, a slot, or a subframe. Duration of one subframe in time domain may be 1 millisecond (ms), one slot includes 7 or 14 symbols, and one mini-slot may include at least one consecutive symbol (for example, 2 symbols, 7 symbols, 14 symbols, or any quantity of symbols less than or equal to 14 symbols).

In addition, for ease of description, the structure of the two-level control channels shown in FIG. 2 is used as an example, and a level-1 control channel, a level-2 control channel, a guard interval, and an uplink time-frequency resource (denoted by a time-frequency resource #A) used for sending feedback acknowledgement information that correspond to a same transport block are denoted by a set of two-level control channels.

In S210, a network device sends first downlink control information DCI to a terminal device on a first downlink control channel, where a time segment corresponding to the first downlink control channel belongs to a first time segment.

That the time segment corresponding to the first downlink control channel belongs to the first time segment means that a length of the time segment (denoted by a time segment #A for ease of distinguishing and understanding) corresponding to the first downlink control channel is less than a length of the first time segment (denoted by a time segment #1 for ease of distinguishing and understanding).

Therefore, in S210, the terminal device receives the first DCI (denoted by DCI #1 for ease of distinguishing and understanding).

In S220, the network device sends a first transport block to the terminal device on a first downlink data channel indicated by the first DCI, where a time segment corresponding to the first downlink data channel belongs to the first time segment.

Specifically, the DCI #1 includes indication information that is used to indicate a time-frequency resource (denoted by a time-frequency resource #1 for ease of distinguishing and understanding) for transmitting the first downlink data channel, and the network device sends the first transport block (denoted by a transport block #1 for ease of distinguishing and understanding) to the terminal device on the time-frequency resource #1 (to be specific, on the first downlink data channel indicated by the first DCI) indicated by the DCI #1.

It should be noted that the network device sends the transport block #1 to the terminal device may also be understood as that the network device sends, to the terminal device, a data signal (denoted by a data signal #1A for ease of distinguishing and understanding) obtained after channel encoding is performed on the transport block #1. In other words, a bit sequence included in the data signal #1A includes a bit sequence of the transport block #1.

That the time segment corresponding to the first downlink data channel belongs to the first time segment means that a length of the time segment (denoted by a time segment #B for ease of distinguishing and understanding) corresponding to the first downlink data channel is less than the length of the time segment #1.

The time segment #1 may be a time segment corresponding to one time domain unit, to be specific, one mini-slot, one slot, or one subframe. Certainly, the time segment #1 may be alternatively a plurality of symbols.

Both the time segment #A and the time segment #B belong to the time segment #1. In other words, the time segment #1 may be a time segment in which information related to receiving of the transport block #1 is sent. Logically, the transport block #1 can be obtained provided that the terminal device can correctly receive the related information on a downlink control channel corresponding to the time segment #1.

Therefore, in S220, after successfully receiving the DCI #1, the terminal device receives the transport block #1 on the first downlink data channel indicated by the DCI #1.

In S230, the network device sends fourth DCI to the terminal device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

Specifically, the time segment (denoted by a time segment #D for ease of distinguishing and understanding) corresponding to the fourth downlink control channel is less than the second time segment (denoted by a time segment #2 for ease of distinguishing and understanding). Similarly, the time segment #2 may be a mini-slot, a slot, or a subframe. Certainly, the time segment #1 may be alternatively a plurality of symbols.

The time segment #2 is different from the time segment #1, and the time segment #2 is later than the time segment #1. In other words, the time segment #D is not a time segment configured by the system to receive the transport block #1, but is a time segment that belongs to the time segment #2 and that is later than the time segment #1.

More specifically, the two sets of two-level control channels shown in FIG. 2 are used as an example. When the time segment #1 is a time segment corresponding to a first set of two-level control channels in the two sets of two-level control channels shown in FIG. 2, the time segment #2 is a time segment corresponding to a second set of two-level control channels.

The fourth DCI (denoted by DCI #4 for ease of distinguishing and understanding) includes first encoding information (denoted by encoding information #1 for ease of distinguishing and understanding), and the encoding information #1 is used to indicate a first encoding mode (denoted by an encoding mode #1 for ease of distinguishing and understanding) of the transport block #1. In this case, when the transport block #1 cannot be correctly decoded by using the information received in the time segment #1, the transport block #1 is decoded by using the encoding information #1 sent in the time segment #D corresponding to the fourth downlink control channel.

Therefore, in S240, the terminal device performs decoding based on the first encoding information, to obtain the first transport block.

Specifically, as described above, that the terminal device receives the transport block #1 may also be understood as that the terminal device receives the data signal #1A. The terminal device processes the data signal #1A by using the encoding information #1, to finally obtain the transport block #1.

Herein, an object processed by the terminal device when the terminal device performs decoding based on the encoding information #1 is a data signal (denoted by a data signal #1B for ease of distinguishing and understanding) obtained after the data signal #1A is demodulated.

It should be noted that in the time segment #1, the network device further sends second DCI (denoted by DCI #2 for ease of distinguishing and understanding) on a second downlink control channel. A time segment (denoted by a time segment #C for ease of distinguishing and understanding) corresponding to the second downlink control channel belongs to the first time segment, and the DCI #2 includes the encoding information #1 of the transport block #1. The terminal device performs a receiving operation for the DCI #2 based on the time-frequency resource indicated by the DCI #1. The receiving operation is successful receiving (a case A) and failed receiving (a case B). In this embodiment of the present invention, the terminal device may perform decoding based on the encoding information #1 in the DCI #4 sent by the network device in the time segment #2, regardless of whether the terminal device successfully receives the DCI #2. Details about the cases are as follows:

Case A

The terminal device can correctly receive the DCI #2; however, due to a reason such as channel quality is relatively poor, although the terminal device can perform decoding by using the encoding information #1 in the DCI #2, decoding effects are poor, and the transport block #1 cannot be correctly obtained either. In this case, the transport block #1 can be obtained by performing decoding by using the encoding information #1 in the DCI #4 sent by the network device in the time segment #2.

Case B

The terminal device fails to receive the DCI #2. Therefore, the terminal device cannot learn of the encoding information #1, and cannot obtain the transport block #1. In this case, the terminal device can obtain the transport block #1 by performing decoding by using the encoding information #1 in the DCI #4 sent by the network device in the time segment #2, so that a data packet loss probability is reduced.

The control channels in this embodiment of the present invention are described below by using the structure of the two-level control channels shown in FIG. 2 as an example.

The first downlink control channel may be a level-1 control channel in the first set of two-level control channels, the second downlink control channel may be a level-2 control channel in the first set of two-level control channels, and the first downlink data channel may be a data channel in the first set of two-level control channels. Correspondingly, the time segment #A may be a time segment corresponding to the level-1 control channel in the first set of two-level control channels, the time segment #C may be a time segment corresponding to the level-2 control channel in the first set of two-level control channels, and the time segment #B may be a time segment corresponding to the data channel in the first set of two-level control channels.

The fourth downlink control channel may be a level-2 control channel in the second set of two-level control channels, and correspondingly, the time segment #D may be a time segment corresponding to the level-2 control channel in the second set of two-level control channels. A level-1 control channel in the second set of two-level control channels shown in FIG. 2 may be used to carry related control information used to receive the DCI #4, or may be used to carry other related information. This embodiment of the present invention is not limited to this. Specific content is described in detail subsequently.

It should be understood that the structure of the two-level control channels shown in FIG. 2 is merely used as an example. This embodiment of the present invention is not limited to this. For example, in a set of two-level control channels, two control channels may at least partially overlap a data channel in time domain, a part of a time segment corresponding to a level-2 control channel partially overlaps a time segment corresponding to a level-1 control channel, and a part of a time segment corresponding to the data channel partially overlaps the time segment corresponding to the level-2 control channel.

Therefore, according to the data transmission method in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

As described above, the level-1 control channel in the second set of two-level control channels shown in FIG. 2 may be used to carry the related control information used to receive the DCI #4. Details are as follows:

Optionally, the method further includes:

sending, by the network device, third DCI to the terminal device on a third downlink control channel, where a time segment corresponding to the third downlink control channel belongs to the second time segment; and sending, by the network device, a second transport block to the terminal device on a second downlink data channel indicated by the third DCI, where a time segment corresponding to the second downlink data channel belongs to the second time segment, where the fourth DCI further includes second encoding information, the second encoding information is used to indicate a second encoding mode of the second transport block, and the second transport block is retransmission of the first transport block.

Specifically, a length of the time segment (denoted by a time segment #E for ease of distinguishing and understanding) corresponding to the third downlink control channel is less than a length of the time segment #2, and a length of the time segment (denoted by a time segment #F for ease of distinguishing and understanding) corresponding to the second downlink data channel is less than the length of the time segment #2. Both the time segment #E and the time segment #F belong to the time segment #2.

More specifically, FIG. 2 is still used as an example. The third downlink control channel may be a level-1 control channel in the second set of two-level control channels, and the second downlink data channel may be a data channel in the second set of two-level control channels. Correspondingly, the time segment #E may be a time segment corresponding to the level-1 control channel in the second set of two-level control channels, and the time segment #F may be a time segment corresponding to the data channel in the second set of two-level control channels.

The third DCI (denoted by DCI #3 for ease of distinguishing and understanding) includes a time-frequency resource (denoted by a time-frequency resource #2 for ease of distinguishing and understanding) used to transmit the transport block #2, and the terminal device receives the transport block #2 on the second downlink data channel. In other words, the terminal device receives the transport block #2 on the time-frequency resource #2. In addition, the DCI #3 includes the second encoding information (denoted by encoding information #2 for ease of distinguishing and understanding), and the encoding information #2 is used to indicate the second encoding mode (denoted by an encoding mode #2 for ease of distinguishing and understanding) of the transport block #2. In this case, the terminal device may perform decoding based on the encoding information #2, to obtain the transport block #2.

Actually, when the terminal device fails to correctly obtain the transport block #1 by using the DCI #2 and the network device sends a retransmitted transport block of the transport block #1 in the second set of two-level control channels, the terminal device may obtain the transport block #1 through combined decoding.

Therefore, in this embodiment of the present invention, the transport block #2 is retransmission of the transport block #1. In this case, the terminal device performs combined decoding based on the encoding information #1 and the encoding information #2, to obtain the transport block #1 (or the transport block #2).

In this way, the terminal device can perform combined decoding based on the first encoding information and the second encoding information, so that decoding accuracy can be more effectively improved, and the first transport block (or the second transport block) is correctly obtained.

It should be supplemented that the DCI #3 may not only indicate the second downlink data channel, but may also indicate the fourth downlink control channel. In other words, the terminal device may receive the DCI #4 on the fourth downlink control channel indicated by the DCI #3.

As an example instead of a limitation, not only the DCI #3 may be used to indicate the fourth downlink control channel, but also higher layer signaling (for example, RRC signaling) may be used to indicate the fourth downlink control channel. This embodiment of the present invention is not limited to this.

It should be understood that when the terminal device performs decoding by using the first encoding information, although the two-level control channels are configured in the system, the network device may not send the DCI #3, but sends only the DCI #4 after sending the DCI #1 and the DCI #2. Similarly, if the transport block #1 fails to be obtained by using the encoding information that is for the transport block #1 and that is in the DCI #4 either, the encoding information for the transport block #1 is sent on a level-2 control channel in a next set of two-level control channels, until the terminal device succeeds in decoding or a sending quantity exceeds a sending quantity specified in the system.

Optionally, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block.

Specifically, the first redundancy version information (denoted by redundancy version information #1 for ease of distinguishing and understanding) and the first data indication information (denoted by data indication information #1 for ease of distinguishing and understanding) may be used to determine an encoding rate of the transport block #1. To be specific, a ratio of a quantity of bits of the transport block #1 indicated by the data indication information #1 to a quantity of bits of an RV number #1 indicated by the RV information #1 is the encoding rate of the transport block #1. Similarly, the second redundancy version information (denoted by redundancy version information #2 for ease of distinguishing and understanding) and the second data indication information (denoted by data indication information #2 for ease of distinguishing and understanding) may be used to determine an encoding rate of the transport block #2. To be specific, a ratio of a quantity of bits of the transport block #2 indicated by the data indication information #2 to a quantity of bits of an RV number #2 indicated by the RV information #2 is the encoding rate of the transport block #2.

A specific method and process of determining the encoding rates of the transport blocks are similar to or the same as those in the prior art. Details are not described herein.

Therefore, for the terminal device, that the terminal device performs combined decoding based on the encoding information #1 and the encoding information #2, to obtain the transport block #1 includes:

the terminal device determines, based on the data indication information #1 and the data indication information #2, that the transport block #2 is retransmission of the transport block #1; and the terminal device performs combined decoding based on the redundancy version information #1 and the redundancy version information #2, to obtain the transport block #1.

Specifically, the terminal device may compare the data indication information #1 with the data indication information #2: If the data indication information #2 is different from the data indication information #1, the transport block #2 is not retransmission of the transport block #1, but is a new transport block; or if the data indication information #2 is the same as the data indication information #1, the transport block #2 is retransmission of the transport block #1.

Whether the transport block is retransmission is described in detail by using an example in which the data indication information #1 and the data indication information #2 each are 1 bit.

It is assumed that the data indication information #1 is {0}. If the data indication information #2 is {1}, the transport block #2 is not retransmission of the transport block #1, but is a new transport block. If the data indication information #2 is {0}, the transport block #2 is retransmission of the transport block #1.

Similarly, it is assumed that the data indication information #1 is {1}. If the data indication information #2 is {0}, the transport block #2 is not retransmission of the transport block #1, but is a new transport block. If the data indication information #2 is {1}, the transport block #2 is retransmission of the transport block #1.

After determining that the transport block #2 is retransmission of the transport block #1, the terminal device performs decoding based on the RV number #1 indicated by the RV information #1 and the RV number #2 indicated by the RV information #2: If the RV number #1 is the same as the RV number #2, it indicates that the encoding rate of the transport block #1 is the same as the encoding rate of the transport block #2, and combined decoding may be performed in a soft combining (CC) manner; or if the RV number #1 is different from the RV number #2, it indicates that the encoding rate of the transport block #1 is different from the encoding rate of the transport block #2, and combined decoding may be performed in an incremental redundancy (Incremental Redundancy, IR) manner.

The CC manner and the IR manner used to perform combined decoding are the same as or similar to those in the prior art. Details are not described herein.

Optionally, the first DCI further includes first modulation information of the first transport block, and the first modulation information is used to indicate a modulation mode of the first transport block; and that the terminal device receives, on a first downlink data channel indicated by the first DCI, a first transport block sent by the network device includes:

the terminal device receives, on the first downlink data channel, a first data signal sent by the network device, where the first data signal is generated after the network device encodes and modulates the first transport block; and the terminal device demodulates the first data signal based on the first modulation information.

As described above, an object decoded by the terminal device is the data signal (denoted by the data signal #1B for ease of distinguishing and understanding) obtained after the data signal #1A is demodulated. In this case, the first modulation information used by the terminal device to demodulate the data signal #1A may be configured in the DCI #1, and the first modulation information is used to indicate the modulation mode of the transport block #1.

As an example instead of a limitation, the first modulation information may be alternatively configured in the DCI #2. This embodiment of the present invention is not limited to this.

It should be noted that when combined decoding is performed, objects processed by the terminal device not only include the data signal #1B, but also include a data signal (denoted by a data signal #2B for ease of distinguishing and distinguishing) obtained after a data signal (denoted by a data signal #2A for ease of distinguishing and distinguishing) corresponding to the transport block #2 is demodulated. In this case, the terminal device performs combined decoding on the data signal #1B and the data signal #2B, to obtain the transport block #1.

Similarly, herein, second modulation information used by the terminal device to demodulate the data signal #1B may be configured in the DCI #3, the second modulation information is used to indicate a modulation mode of the transport block #2, and the modulation mode of the transport block #1 may be the same as or different from the modulation mode of the transport block #1.

Optionally, the terminal device buffers a data signal obtained after the first data signal is demodulated.

To be specific, the terminal device buffers the data signal #1B obtained after the data signal #1 is demodulated, and may buffer the data signal #1B in a circular buffer. In this way, when decoding, by using the encoding information #1 sent in the time segment #2, the data signal #1B sent in the time segment #1, the terminal device may directly obtain the data signal 1B from the circular buffer.

Optionally, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

As described above, in the two-level control channels, the two control channels may at least partially overlap the data channel in time domain. Herein, in the two-level control channels, the two control channels are separated from the data channel in time domain, so that more signal processing time can be provided for the network device and the user equipment.

Therefore, according to the data transmission method in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

In addition, the terminal device can perform combined decoding based on the first encoding information and the second encoding information, so that decoding accuracy can be more effectively improved, and the first transport block (or the second transport block) is correctly obtained.

In addition, in the two-level control channels, the two control channels are separated from the data channel in time domain, so that more signal processing time can be provided for the network device and the user equipment.

The foregoing describes in detail, with reference to FIG. 1 to FIG. 3, the data transmission method according to the embodiments of the present invention. The following describes, with reference to FIG. 4 to FIG. 7, data transmission apparatuses according to the embodiments of the present invention. Technical features described in the method embodiments are also applicable to the following apparatus embodiments.

Figure 4:
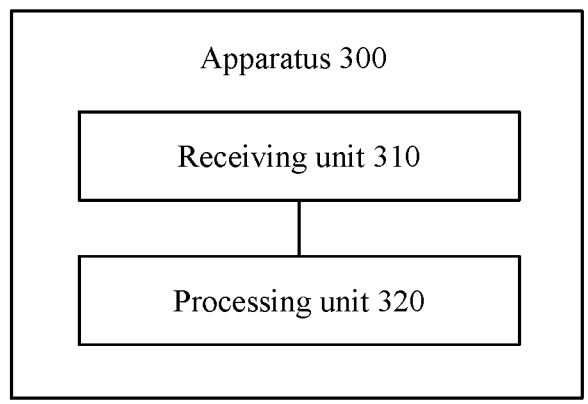
FIG. 4 is a schematic block diagram of a data transmission apparatus according to an embodiment of the present invention.

FIG. 4 describes a data transmission apparatus according to an embodiment of the present invention. The apparatus 300 includes a receiving unit 310 and a processing unit 320.

The receiving unit 310 is configured to receive first downlink control information DCI sent by a network device on a first downlink control channel, where a time segment corresponding to the first downlink control channel belongs to a first time segment.

The receiving unit 310 is further configured to receive, on a first downlink data channel indicated by the first DCI, a first transport block sent by the network device, where a time segment corresponding to the first downlink data channel belongs to the first time segment.

The receiving unit 310 is further configured to receive fourth DCI sent by the network device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

The processing unit 320 is configured to perform decoding based on the first encoding information received by the receiving unit 310, to obtain the first transport block.

For specific descriptions of the foregoing time segments and control channels, refer to the descriptions about FIG. 2 in the method embodiments. Details are not described herein again.

In addition, for a plurality of cases in which the apparatus performs decoding by using the first encoding information, refer to the specific descriptions of step S240 in the method embodiments. Details are not described herein again.

Therefore, according to the data transmission apparatus in this embodiment of the present invention, when the apparatus fails to correctly obtain the first transport block through decoding in the first time segment, the apparatus may perform decoding by using the first encoding information that is of the first transport block and that is sent by the network device in the second time segment later than the first time segment. To be specific, the apparatus performs decoding by using the first encoding information that is sent by the network device in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

Optionally, the processing unit 320 is specifically configured to:

when the receiving unit 310 fails to receive, based on the first DCI, second DCI sent by the network device on a second downlink control channel, perform decoding based on the first encoding information, to obtain the first transport block, where a time segment corresponding to the second downlink control channel belongs to the first time segment, and the second DCI includes the first encoding information.

Optionally, the receiving unit 310 is further configured to:

receive third DCI sent by the network device on a third downlink control channel, where a time segment corresponding to the third downlink control channel belongs to the second time segment; and receive, on a second downlink data channel indicated by the third DCI, a second transport block sent by the network device, where a time segment corresponding to the second downlink data channel belongs to the second time segment, where the fourth DCI further includes second encoding information, the second encoding information is used to indicate a second encoding mode of the second transport block, and the second transport block is retransmission of the first transport block; and the processing unit 320 is specifically configured to:

perform combined decoding based on the first encoding information and the second encoding information, to obtain the first transport block.

In this way, the apparatus can perform combined decoding based on the first encoding information and the second encoding information, so that decoding accuracy can be more effectively improved, and the first transport block (or the second transport block) is correctly obtained.

Optionally, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block; and the processing unit 320 is specifically configured to:

determine, based on the first data indication information and the second data indication information, that the second transport block is retransmission of the first transport block; and perform combined decoding based on the first redundancy version information and the second redundancy version information, to obtain the first transport block.

For further descriptions about content of the first encoding information and the second encoding information in the fourth DCI, refer to the specific descriptions about the first encoding information and the second encoding information in the method embodiments.

In addition, for a specific process in which the apparatus performs decoding by using the first encoding information and the second encoding information, refer to a specific process in which the terminal device performs decoding by using the first encoding information and the second encoding information in the method embodiments. Details are not described herein again.

Optionally, the first DCI further includes first modulation information of the first transport block, and the first modulation information is used to indicate a modulation mode of the first transport block; and the receiving unit 310 is specifically configured to:

receive, on the first downlink data channel, a first data signal sent by the network device, where the first data signal is generated after the network device encodes and modulates the first transport block; and demodulate the first data signal based on the first modulation information.

For a specific process in which the apparatus demodulates the first data signal based on the first modulation information, refer to a specific process in which the terminal device demodulates the first data signal based on the first modulation information in the method embodiments. Details are not described herein again.

In addition, for related configuration of the first modulation information, refer to the descriptions about the first modulation information in the method embodiments. Details are not described herein again.

Optionally, the processing unit 320 is further configured to:

buffer a data signal obtained after the first data signal is demodulated.

Optionally, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

The data transmission apparatus 300 according to this embodiment of the present invention may correspond to the terminal device in the method according to the embodiments of the present invention, and the units and the modules of the data transmission apparatus 300 and the foregoing other operations and/or functions are separately used to implement corresponding procedures performed by the terminal device in the method 200. For brevity, details are not described herein again.

Therefore, according to the data transmission apparatus in this embodiment of the present invention, when the apparatus fails to correctly obtain the first transport block through decoding in the first time segment, the apparatus may perform decoding by using the first encoding information that is of the first transport block and that is sent by the network device in the second time segment later than the first time segment. To be specific, the apparatus performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

In addition, the apparatus can perform combined decoding based on the first encoding information and the second encoding information, so that decoding accuracy can be more effectively improved, and the first transport block (or the second transport block) is correctly obtained.

In addition, in two-level control channels, the two control channels are separated from a data channel in time domain, so that more signal processing time can be provided for the network device and the user equipment.

Figure 5:
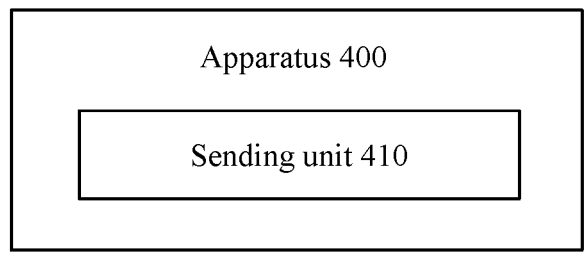
FIG. 5 is a schematic block diagram of a data transmission apparatus according to an embodiment of the present invention.

FIG. 5 describes a data transmission apparatus according to an embodiment of the present invention. The apparatus 400 includes:

a sending unit 410, configured to send first downlink control information DCI to a terminal device on a first downlink control channel, where a time segment corresponding to the first downlink control channel belongs to a first time segment.

The sending unit 410 is further configured to send a first transport block to the terminal device on a first downlink data channel indicated by the first DCI, where a time segment corresponding to the first downlink data channel belongs to the first time segment.

The sending unit 410 is further configured to send fourth DCI to the terminal device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

For specific descriptions of the foregoing time segments and control channels, refer to the descriptions about FIG. 2 in the method embodiments. Details are not described herein again.

Therefore, according to the data transmission apparatus in this embodiment of the present invention, when the terminal device fails to correctly obtain the first transport block through decoding in the first time segment, the terminal device may perform decoding by using the first encoding information that is of the first transport block and that is sent by the apparatus in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

Optionally, the sending unit 410 is further configured to:
send second DCI to the terminal device on a second downlink control channel indicated by the first DCI, where a time segment corresponding to the second downlink control channel belongs to the first time segment, and the second DCI includes the first encoding information.

Optionally, the sending unit 410 is further configured to:
send third DCI to the terminal device on a third downlink control channel, where a time segment corresponding to the third downlink control channel belongs to the second time segment; and
send a second transport block to the terminal device on a second downlink data channel indicated by the third DCI, where a time segment corresponding to the second downlink data channel belongs to the second time segment, where
the fourth DCI further includes second encoding information, the second encoding information is used to indicate a second encoding mode of the second transport block, and the second transport block is retransmission of the first transport block.

In this way, the terminal device can perform combined decoding based on the first encoding information and the second encoding information, so that decoding accuracy can be more effectively improved, and the first transport block (or the second transport block) is correctly obtained.

Optionally, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block.

For further descriptions about content of the first encoding information and the second encoding information in the fourth DCI, refer to the specific descriptions about the first encoding information and the second encoding information in the method embodiments.

Optionally, the first DCI further includes first modulation information of the first transport block, and the first modulation information is used to indicate a modulation mode of the first transport block.

For related configuration of the first modulation information, refer to the descriptions about the first modulation information in the method embodiments. Details are not described herein again.

Optionally, the time segment corresponding to the second downlink control channel is later than the time segment corresponding to the first downlink control channel, and the time segment corresponding to the first downlink data channel is later than the time segment corresponding to the second downlink control channel; and/or
the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

The data transmission apparatus 400 according to this embodiment of the present invention may correspond to the network device in the method according to the embodiments of the present invention, and the units and the modules of the data transmission apparatus 400 and the foregoing other operations and/or functions are separately used to implement corresponding procedures performed by the network device in the method 200. For brevity, details are not described herein again.

Therefore, according to the data transmission apparatus in this embodiment of the present invention, when the terminal device fails to correctly obtain the first transport block through decoding in the first time segment, the terminal device may perform decoding by using the first encoding information that is of the first transport block and that is sent by the apparatus in the second time segment later than the first time segment. To be specific, the terminal device performs decoding using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

In addition, the terminal device can perform combined decoding based on the first encoding information and the second encoding information, so that decoding accuracy can be more effectively improved, and the first transport block (or the second transport block) is correctly obtained.

In addition, in two-level control channels, the two control channels are separated from a data channel in time domain, so that more signal processing time can be provided for the network device and the user equipment.

Figure 6:
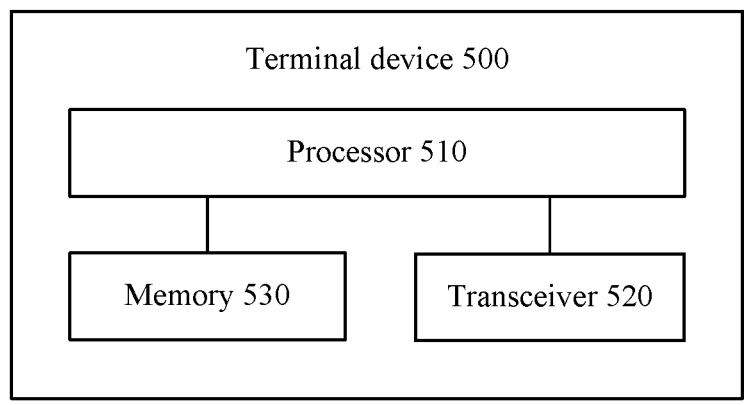
FIG. 6 is a schematic structural diagram of a terminal device for data transmission according to an embodiment of the present invention.

FIG. 6 shows a terminal device 500 for data transmission according to an embodiment of the present invention. The terminal device 500 includes:
a processor 510, a transceiver 520, and a memory 530, where the processor 510, the transceiver 520, and the memory 530 communicate with each other by using an internal connection path.

The memory 530 is configured to store a program. Specifically, the program may include program code, and the program code includes a computer operation instruction. The memory 530 may include a read-only memory and a random access memory, and provides an instruction and data for the processor 510. The memory 530 may include a high-speed RAM memory, and may further include a non-volatile memory (non-volatile memory), for example, at least one magnetic disk storage.

The processor 510 executes the program stored in the memory 530, to control the transceiver 520 to receive a signal or send a signal. The memory 530 may be integrated into the processor 510, or may be independent of the processor 510.

Specifically, the transceiver 520 is configured to:

receive first downlink control information DCI sent by a network device on a first downlink control channel, where a time segment corresponding to the first downlink control channel belongs to a first time segment;

receive, on a first downlink data channel indicated by the first DCI, a first transport block sent by the network device, where a time segment corresponding to the first downlink data channel belongs to the first time segment; and receive fourth DCI sent by the network device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

The processor 510 is configured to:

For specific descriptions of the foregoing time segments and control channels, refer to the descriptions about FIG. 2 in the method embodiments. Details are not described herein again.

In addition, for a plurality of cases in which the terminal device performs decoding by using the first encoding information, refer to the specific descriptions of step S240 in the method embodiments. Details are not described herein again.

Therefore, according to the terminal device for data transmission in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

Optionally, the processor 510 is specifically configured to:

when the transceiver 520 fails to receive, based on the first DCI, second DCI sent by the network device on a second downlink control channel, perform decoding based on the first encoding information, to obtain the first transport block, where a time segment corresponding to the second downlink control channel belongs to the first time segment, and the second DCI includes the first encoding information.

Optionally, the transceiver 520 is further configured to:

receive third DCI sent by the network device on a third downlink control channel, where a time segment corresponding to the third downlink control channel belongs to the second time segment; and receive, on a second downlink data channel indicated by the third DCI, a second transport block sent by the network device, where a time segment corresponding to the second downlink data channel belongs to the second time segment, where the fourth DCI further includes second encoding information, the second encoding information is used to indicate a second encoding mode of the second transport block, and the second transport block is retransmission of the first transport block; and the processor 510 is specifically configured to:

perform combined decoding based on the first encoding information and the second encoding information, to obtain the first transport block.

In this way, the terminal device can perform combined decoding based on the first encoding information and the second encoding information, so that decoding accuracy can be more effectively improved, and the first transport block (or the second transport block) is correctly obtained.

Optionally, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block; and the processor 510 is specifically configured to:

determine, based on the first data indication information and the second data indication information, that the second transport block is retransmission of the first transport block; and perform combined decoding based on the first redundancy version information and the second redundancy version information, to obtain the first transport block.

For further descriptions about content of the first encoding information and the second encoding information in the fourth DCI, refer to the specific descriptions about the first encoding information and the second encoding information in the method embodiments.

In addition, for a specific process in which the terminal device performs decoding by using the first encoding information and the second encoding information, refer to a specific process in which the terminal device performs decoding by using the first encoding information and the second encoding information in the method embodiments. Details are not described herein again.

Optionally, the first DCI further includes first modulation information of the first transport block, and the first modulation information is used to indicate a modulation mode of the first transport block; and the transceiver 520 is specifically configured to:

receive, on the first downlink data channel, a first data signal sent by the network device, where the first data signal is generated after the network device encodes and modulates the first transport block; and demodulate the first data signal based on the first modulation information.

For a specific process in which the terminal device demodulates the first data signal based on the first modulation information, refer to a specific process in which the terminal device demodulates the first data signal based on the first modulation information in the method embodiments. Details are not described herein again.

In addition, for related configuration of the first modulation information, refer to the descriptions about the first modulation information in the method embodiments. Details are not described herein again.

Optionally, the processor 510 is further configured to:

buffer a data signal obtained after the first data signal is demodulated.

Optionally, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

This embodiment of the present invention may be applied to the processor, or implemented by the processor. The processor may be an integrated circuit chip and has a signal processing capability. In an implementation process, steps in the foregoing methods can be implemented by using a hardware integrated logical circuit in the processor 510, or by using instructions in a form of software. The processor 510 may be a general-purpose processor, including a central processing unit (CPU), a network processor (NP), and the like; or may be a digital signal processor (DSP), an application-specific integrated circuit (ASIC), a field programmable gate array (FPGA) or another programmable logical device, a discrete gate or a transistor logical device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 530, and the processor 510 reads information in the memory 530 and completes the steps in the foregoing methods in combination with hardware of the processor. To avoid repetition, details are not described herein again.

It may be understood that the memory in this embodiment of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. As an example instead of limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

The terminal device 500 for data transmission according to this embodiment of the present invention may correspond to the terminal device in the method 200 according to the embodiments of the present invention, and may also correspond to the apparatus 300 according to the embodiments of the present invention, and the units and the modules of the terminal device 500 for data transmission and the foregoing other operations and/or functions are separately used to implement corresponding procedures performed by the terminal device in the method 200. For brevity, details are not described herein again.

Therefore, according to the terminal device for data transmission in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

In addition, the terminal device can perform combined decoding based on the first encoding information and the second encoding information, so that decoding accuracy can be more effectively improved, and the first transport block (or the second transport block) is correctly obtained.

In addition, in two-level control channels, the two control channels are separated from a data channel in time domain, so that more signal processing time can be provided for the network device and the user equipment.

Figure 7:
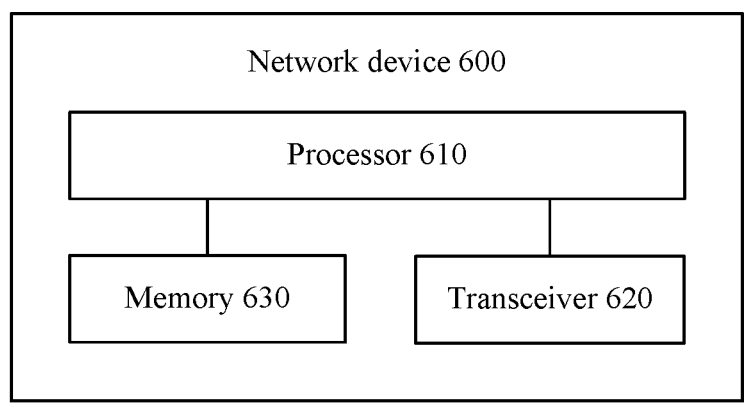
FIG. 7 is a schematic structural diagram of a network device for data transmission according to an embodiment of the present invention.

FIG. 7 shows a network device 600 for data transmission according to an embodiment of the present invention. The network device 600 includes:

a processor 610, a transceiver 620, and a memory 630, where the processor 610, the transceiver 620, and the memory 630 communicate with each other by using an internal connection path.

The memory 630 is configured to store a program. Specifically, the program may include program code, and the program code includes a computer operation instruction. The memory 630 may include a read-only memory and a random access memory, and provides an instruction and data for the processor 610. The memory 630 may include a high-speed RAM memory, and may further include a non-volatile memory (non-volatile memory), for example, at least one magnetic disk storage.

The processor 610 executes the program stored in the memory 630, to control the transceiver 620 to receive a signal or send a signal. The memory 630 may be integrated into the processor 610, or may be independent of the processor 610.

Specifically, the transceiver 620 is configured to:

send first downlink control information DCI to a terminal device on a first downlink control channel, where a time segment corresponding to the first downlink control channel belongs to a first time segment;

send a first transport block to the terminal device on a first downlink data channel indicated by the first DCI, where a time segment corresponding to the first downlink data channel belongs to the first time segment; and send fourth DCI to the terminal device on a fourth downlink control channel, where a time segment corresponding to the fourth downlink control channel belongs to a second time segment, the second time segment is later than the first time segment, the fourth DCI includes first encoding information, and the first encoding information is used to indicate a first encoding mode of the first transport block.

For specific descriptions of the foregoing time segments and control channels, refer to the descriptions about FIG. 2 in the method embodiments. Details are not described herein again.

Therefore, according to the network device for data transmission in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

Optionally, the transceiver 620 is further configured to:

send second DCI to the terminal device on a second downlink control channel indicated by the first DCI, where a time segment corresponding to the second downlink control channel belongs to the first time segment, and the second DCI includes the first encoding information.

Optionally, the transceiver 620 is further configured to:

send third DCI to the terminal device on a third downlink control channel, where a time segment corresponding to the third downlink control channel belongs to the second time segment; and send a second transport block to the terminal device on a second downlink data channel indicated by the third DCI, where a time segment corresponding to the second downlink data channel belongs to the second time segment, where the fourth DCI further includes second encoding information, the second encoding information is used to indicate a second encoding mode of the second transport block, and the second transport block is retransmission of the first transport block.

In this way, the terminal device can perform combined decoding based on the first encoding information and the second encoding information, so that decoding accuracy can be more effectively improved, and the first transport block (or the second transport block) is correctly obtained.

Optionally, the first encoding information includes first redundancy version information and first data indication information that are corresponding to the first transport block, the second encoding information includes second redundancy version information and second data indication information that are corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block.

For further descriptions about content of the first encoding information and the second encoding information in the fourth DCI, refer to the specific descriptions about the first encoding information and the second encoding information in the method embodiments.

Optionally, the first DCI further includes first modulation information of the first transport block, and the first modulation information is used to indicate a modulation mode of the first transport block.

For related configuration of the first modulation information, refer to the descriptions about the first modulation information in the method embodiments. Details are not described herein again.

Optionally, the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

In this way, in two-level control channels, the two control channels are separated from a data channel in time domain, so that more signal processing time can be provided for the network device and the terminal device.

This embodiment of the present invention may be applied to the processor, or implemented by the processor. The processor may be an integrated circuit chip and has a signal processing capability. In an implementation process, steps in the foregoing methods can be implemented by using a hardware integrated logical circuit in the processor 610, or by using instructions in a form of software. The processor 610 may be a general-purpose processor, including a central processing unit (CPU), a network processor (NP), and the like; or may be a digital signal processor (DSP), an application-specific integrated circuit (ASIC), a field programmable gate array (FPGA) or another programmable logical device, a discrete gate or a transistor logical device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 630, and the processor 610 reads information in the memory 630 and completes the steps in the foregoing methods in combination with hardware of the processor. To avoid repetition, details are not described herein again.

It may be understood that the memory in this embodiment of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. As an example instead of limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

The network device 600 for data transmission according to this embodiment of the present invention may correspond to the network device in the method 200 according to the embodiments of the present invention, and may also correspond to the apparatus 400 according to the embodiments of the present invention, and the units and the modules of the network device 600 for data transmission and the foregoing other operations and/or functions are separately used to implement corresponding procedures performed by the network device in the method 200. For brevity, details are not described herein again.

Therefore, according to the network device for data transmission in this embodiment of the present invention, when the terminal device fails to correctly obtain the first transport block through decoding in the first time segment, the terminal device may perform decoding by using the first encoding information that is of the first transport block and that is sent by the network device in the second time segment later than the first time segment. To be specific, the terminal device performs decoding by using the first encoding information that is sent in the second time segment later than a time period corresponding to a first set of two-level control channels corresponding to the first transport block, to obtain the first transport block. In this way, a data packet loss probability is reduced, and data transmission efficiency is improved. In particular, for a data loss resulting from a loss of a level-2 control channel that is caused by a structure of two-level control channels, the data packet loss probability can be more effectively reduced in this embodiment of the present invention.

In addition, the terminal device can perform combined decoding based on the first encoding information and the second encoding information, so that decoding accuracy can be more effectively improved, and the first transport block (or the second transport block) is correctly obtained.

In addition, in two-level control channels, the two control channels are separated from a data channel in time domain, so that more signal processing time can be provided for the network device and the user equipment.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A data transmission method, wherein the method comprises:
    receiving, by a terminal device, first downlink control information (DCI) sent by a network device on a first downlink control channel, wherein a time segment corresponding to the first downlink control channel belongs to a first time segment;
    receiving, by the terminal device on a first downlink data channel indicated by the first DCI, a first transport block sent by the network device, wherein a time segment corresponding to the first downlink data channel belongs to the first time segment;
    receiving, by the terminal device, fourth DCI sent by the network device on a fourth downlink control channel, wherein a time segment corresponding to the fourth downlink control channel belongs to a second time segment, the second time segment is later than the first time segment, the fourth DCI comprises first encoding information, and the first encoding information is used to indicate a first encoding mode of the first transport block; and
    performing, by the terminal device, decoding based on the first encoding information, to obtain the first transport block.

2. The method according to claim 1, wherein the performing, by the terminal device, decoding based on the first encoding information, to obtain the first transport block comprises:
    when the terminal device fails to receive, based on the first DCI, second DCI sent by the network device on a second downlink control channel, performing, by the terminal device, decoding based on the first encoding information, to obtain the first transport block, wherein a time segment corresponding to the second downlink control channel belongs to the first time segment, and the second DCI comprises the first encoding information.

3. The method according to claim 1, wherein the method further comprises:
    receiving, by the terminal device, third DCI sent by the network device on a third downlink control channel, wherein a time segment corresponding to the third downlink control channel belongs to the second time segment; and
    receiving, by the terminal device on a second downlink data channel indicated by the third DCI, a second transport block sent by the network device, wherein a time segment corresponding to the second downlink data channel belongs to the second time segment, wherein
    the fourth DCI further comprises second encoding information, the second encoding information is used to indicate a second encoding mode of the second transport block, and the second transport block is retransmission of the first transport block; and
    the performing, by the terminal device, decoding based on the first encoding information, to obtain the first transport block comprises:
    performing, by the terminal device, combined decoding based on the first encoding information and the second encoding information, to obtain the first transport block.

4. The method according to claim 3, wherein the first encoding information comprises first redundancy version information and first data indication information corresponding to the first transport block, the second encoding information comprises second redundancy version information and second data indication information corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block; and
    the performing, by the terminal device, combined decoding based on the first encoding information and the second encoding information, to obtain the first transport block comprises:
    determining, by the terminal device based on the first data indication information and the second data indication information, that the second transport block is retransmission of the first transport block; and
    performing, by the terminal device, combined decoding based on the first redundancy version information and the second redundancy version information, to obtain the first transport block.

5. The method according to claim 1, wherein the first DCI further comprises first modulation information of the first transport block, and the first modulation information is used to indicate a modulation mode of the first transport block; and
    the receiving, by the terminal device on a first downlink data channel indicated by the first DCI, a first transport block sent by the network device comprises:
    receiving, by the terminal device on the first downlink data channel, a first data signal sent by the network device, wherein the first data signal is generated after the network device encodes and modulates the first transport block; and
    demodulating, by the terminal device, the first data signal based on the first modulation information.

6. The method according to claim 5, wherein the method further comprises:
    buffering, by the terminal device, a data signal obtained after the first data signal is demodulated.

7. The method according to claim 3, wherein the time segment corresponding to the second downlink control channel is later than the time segment corresponding to the first downlink control channel, and the time segment corresponding to the first downlink data channel is later than the time segment corresponding to the second downlink control channel; and/or
    the time segment corresponding to the fourth downlink control channel is later than the time segment corresponding to the third downlink control channel, and the time segment corresponding to the second downlink data channel is later than the time segment corresponding to the fourth downlink control channel.

8. A data transmission method, wherein the method comprises:
sending, by a network device, first downlink control information (DCI) to a terminal device on a first downlink control channel, wherein a time segment corresponding to the first downlink control channel belongs to a first time segment;
sending, by the network device, a first transport block to the terminal device on a first downlink data channel indicated by the first DCI, wherein a time segment corresponding to the first downlink data channel belongs to the first time segment; and
sending, by the network device, fourth DCI to the terminal device on a fourth downlink control channel, wherein a time segment corresponding to the fourth downlink control channel belongs to a second time segment, the second time segment is later than the first time segment, the fourth DCI comprises first encoding information, and the first encoding information is used to indicate a first encoding mode of the first transport block.

9. The method according to claim 8, wherein the method further comprises:
sending, by the network device, second DCI to the terminal device on a second downlink control channel indicated by the first DCI, wherein a time segment corresponding to the second downlink control channel belongs to the first time segment, and the second DCI comprises the first encoding information.

10. The method according to claim 8, wherein the method further comprises:
sending, by the network device, third DCI to the terminal device on a third downlink control channel, wherein a time segment corresponding to the third downlink control channel belongs to the second time segment; and
sending, by the network device, a second transport block to the terminal device on a second downlink data channel indicated by the third DCI, wherein a time segment corresponding to the second downlink data channel belongs to the second time segment, wherein
the fourth DCI further comprises second encoding information, the second encoding information is used to indicate a second encoding mode of the second transport block, and the second transport block is retransmission of the first transport block.

11. The method according to claim 10, wherein the first encoding information comprises first redundancy version information and first data indication information corresponding to the first transport block, the second encoding information comprises second redundancy version information and second data indication information corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block.

12. The method according to claim 8, wherein the first DCI further comprises first modulation information of the first transport block, and the first modulation information is used to indicate a modulation mode of the first transport block.

13. The method according to claim 10, wherein the time segment corresponding to the second downlink control channel is later than the time segment corresponding to the first downlink control channel, and the time segment corresponding to the first downlink data channel is later than the time segment corresponding to the second downlink control channel; and/or
the time segment corresponding to the fourth downlink control channel is later than the time segment corresponding to the third downlink control channel, and the time segment corresponding to the second downlink data channel is later than the time segment corresponding to the fourth downlink control channel.

14. A data transmission apparatus, wherein the apparatus comprises:
a receiver, configured to receive first downlink control information (DCI) sent by a network device on a first downlink control channel, wherein a time segment corresponding to the first downlink control channel belongs to a first time segment; wherein
the receiver is further configured to receive, on a first downlink data channel indicated by the first DCI, a first transport block sent by the network device, wherein a time segment corresponding to the first downlink data channel belongs to the first time segment; and
the receiver is further configured to receive fourth DCI sent by the network device on a fourth downlink control channel, wherein a time segment corresponding to the fourth downlink control channel belongs to a second time segment, the second time segment is later than the first time segment, the fourth DCI comprises first encoding information, and the first encoding information is used to indicate a first encoding mode of the first transport block; and
a processor, configured to perform decoding based on the first encoding information received by the receiving unit, to obtain the first transport block.

15. The apparatus according to claim 14, wherein the processor is specifically configured to:
when the receiver fails to receive, based on the first DCI, second DCI sent by the network device on a second downlink control channel, perform decoding based on the first encoding information, to obtain the first transport block, wherein a time segment corresponding to the second downlink control channel belongs to the first time segment, and the second DCI comprises the first encoding information.

16. The apparatus according to claim 14, wherein the receiver is further configured to:
receive third DCI sent by the network device on a third downlink control channel, wherein a time segment corresponding to the third downlink control channel belongs to the second time segment; and
receive, on a second downlink data channel indicated by the third DCI, a second transport block sent by the network device, wherein a time segment corresponding to the second downlink data channel belongs to the second time segment, wherein
the fourth DCI further comprises second encoding information, the second encoding information is used to indicate a second encoding mode of the second transport block, and the second transport block is retransmission of the first transport block; and
the processor is configured to:
perform combined decoding based on the first encoding information and the second encoding information, to obtain the first transport block.

17. The apparatus according to claim 16, wherein the first encoding information comprises first redundancy version information and first data indication information corresponding to the first transport block, the second encoding information comprises second redundancy version information and second data indication information corresponding to the second transport block, the first data indication information is used to indicate whether the first transport block is retransmission of a transport block sent by the network device on a third downlink data channel, a time segment corresponding to the third downlink data channel is earlier than the first time segment, and the second data indication information is used to indicate whether the second transport block is retransmission of the first transport block; and the processor is configured to:
determine, based on the first data indication information and the second data indication information, that the second transport block is retransmission of the first transport block; and
perform combined decoding based on the first redundancy version information and the second redundancy version information, to obtain the first transport block.

18. The apparatus according to claim 14, wherein the first DCI further comprises first modulation information of the first transport block, and the first modulation information is used to indicate a modulation mode of the first transport block; and the receiver is configured to:
receive, on the first downlink data channel, a first data signal sent by the network device, wherein the first data signal is generated after the network device encodes and modulates the first transport block; and
demodulate the first data signal based on the first modulation information.

19. The apparatus according to claim 18, wherein the processor is further configured to:
buffer a data signal obtained after the first data signal is demodulated.

20. The apparatus according to claim 16, wherein the time segment corresponding to the second downlink control channel is later than the time segment corresponding to the first downlink control channel, and the time segment corresponding to the first downlink data channel is later than the time segment corresponding to the second downlink control channel; and/or the time segment corresponding to the fourth downlink control channel is later than the time segment corresponding to the third downlink control channel, and the time segment corresponding to the second downlink data channel is later than the time segment corresponding to the fourth downlink control channel.

* * * * *